US011950072B2

(12) United States Patent
Chai et al.

(10) Patent No.: US 11,950,072 B2
(45) Date of Patent: Apr. 2, 2024

(54) MID-RANGE LOUDSPEAKER

(71) Applicant: SUZHOU SONAVOX ELECTRONICS CO., LTD., Jiangsu (CN)

(72) Inventors: Guoqiang Chai, Jiangsu (CN); Yuewu Shen, Jiangsu (CN); Bo Gu, Jiangsu (CN)

(73) Assignee: Suzhou Sonavox Electronics Co., Ltd., Jiangsu (CN)

( * ) Notice: Subject to any disclaimer, the term of this patent is extended or adjusted under 35 U.S.C. 154(b) by 249 days.

(21) Appl. No.: 17/593,374

(22) PCT Filed: Oct. 17, 2019

(86) PCT No.: PCT/CN2019/111689
§ 371 (c)(1),
(2) Date: Sep. 16, 2021

(87) PCT Pub. No.: WO2020/199554
PCT Pub. Date: Oct. 8, 2020

(65) Prior Publication Data

US 2022/0150639 A1 May 12, 2022

(30) Foreign Application Priority Data

Apr. 2, 2019 (CN) ........................ 201920435417.9

(51) Int. Cl.
*H04R 9/06* (2006.01)
*H04R 7/06* (2006.01)
(Continued)

(52) U.S. Cl.
CPC ............... *H04R 9/025* (2013.01); *H04R 7/06* (2013.01); *H04R 7/10* (2013.01); *H04R 9/06* (2013.01);
(Continued)

(58) Field of Classification Search
CPC . H04R 7/06; H04R 7/10; H04R 7/125; H04R 9/025; H04R 9/06; H04R 2307/021;
(Continued)

(56) References Cited

U.S. PATENT DOCUMENTS 3,111,187 A * 11/1963 Barlow .................... H04R 7/06 181/170
4,122,314 A * 10/1978 Matsuda ................ H04R 9/063 181/170
(Continued)

FOREIGN PATENT DOCUMENTS

| | | |
|---|---|---|
| CN | 101990151 A | 3/2011 |
| CN | 201898609 U | 7/2011 |
| CN | 209330397 U | 8/2019 |

OTHER PUBLICATIONS

International Search Report and Written Opinion for International Patent Application No. PCT/CN2019/111689, dated Jan. 2, 2020.

*Primary Examiner* — Huyen D Le
(74) *Attorney, Agent, or Firm* — Knobbe, Martens, Olson & Bear LLP

(57) ABSTRACT

A mid-range loudspeaker, including a frame, a diaphragm arranged on the frame, a magnetic circuit system arranged on the frame, and a voice coil connected to the diaphragm. The diaphragm includes a honeycomb plate having a front surface and a back surface. Covering films respectively cover the front surface and the back surface of the honeycomb plate. The honeycomb plate is provided with a plurality of holes.

9 Claims, 2 Drawing Sheets

(51) Int. Cl.
*H04R 7/10* (2006.01)
*H04R 9/02* (2006.01)

(52) U.S. Cl.
CPC .. *H04R 2307/021* (2013.01); *H04R 2307/025* (2013.01); *H04R 2307/027* (2013.01); *H04R 2307/029* (2013.01)

(58) Field of Classification Search
CPC ........ H04R 2307/025; H04R 2307/027; H04R 2307/029
See application file for complete search history.

(56) References Cited

U.S. PATENT DOCUMENTS

| | | | | |
|---|---|---|---|---|
| 4,198,550 A * | 4/1980 | Matsuda | H04R 9/06 181/170 |
| 4,272,653 A * | 6/1981 | Osato | H04R 31/003 381/431 |
| 2003/0031338 A1* | 2/2003 | Suzuki | H04R 9/025 381/412 |
| 2003/0051940 A1 | 3/2003 | Anthony et al. | |

* cited by examiner

MID-RANGE LOUDSPEAKER

CROSS REFERENCE TO RELATED APPLICATION(S)

This application is the U.S. National Phase under 35 U.S.C. § 371 of International Application PCT/CN2019/111689, filed Oct. 17, 2019, which claims priority from Chinese Patent Application CN 201920435417.9 filed on Apr. 2, 2019, each of which is incorporated herein by reference in its entirety.

TECHNICAL FIELD

The present disclosure relates to the loudspeaker field, in particular to a mid-range loudspeaker.

BACKGROUND

For the traditional mid-range loudspeakers, the bandwidth can generally reach to 10 KHz, and strong directivity is required. However, it is difficult for traditional mid-range loudspeakers to further extend the bandwidth to 20 KHz, and it is difficult to improve the directivity.

SUMMARY

In view of the above-mentioned problems, the present disclosure provides a mid-range loudspeaker of which the operating range can extend to 20 KHz and which has an improved high-frequency directivity.

To achieve the above purpose, the technical solution employed by the present disclosure is: a mid-range loudspeaker, comprising a frame, a diaphragm arranged on the frame, a magnetic circuit system arranged on the frame, and a voice coil connected to the diaphragm, the diaphragm comprises a honeycomb plate having a front surface and a back surface, and covering films respectively covering the front surface and the back surface of the honeycomb plate, and the honeycomb plate is provided with a plurality of holes.

In an embodiment, the holes of the honeycomb plate are through holes that go though the honeycomb plate from the front surface to the back surface thereof.

In an embodiment, the honeycomb plate is made of one or a combination of paper, Nomex insulation paper, aluminum, and foam material.

In an embodiment, the covering films are made of one or a combination of paper, glass fiber, aluminum, and Kevlar.

In an embodiment, the diaphragm is flat shaped.

In an embodiment, the diaphragm is composed of the honeycomb plate and the covering films, and the diaphragm is flat in shape as a whole.

In an embodiment, the diaphragm is connected to the frame through a yoke ring, and the yoke ring is fixedly connected to an outer edge of the diaphragm.

In an embodiment, the yoke ring is fixedly connected to the covering film on the front surface of the honeycomb plate.

In an embodiment, the magnetic circuit system comprises a U-yoke, a main magnetic steel, a front sheet, and a secondary magnetic steel, the U-yoke is fixedly connected to the frame, the main magnetic steel, the front sheet and the secondary magnetic steel are stacked and arranged on a bottom of the U-yoke, and the voice coil is inserted in a gap between an upper end portion of the U-yoke and the front sheet.

In an embodiment, the main magnetic steel is glued to the U-yoke, the front sheet is glued to the the main magnetic steel, and the secondary magnetic steel is glued to the front sheet.

In an embodiment, the voice coil is fixedly connected to the diaphragm through a voice coil bobbin.

In an embodiment, the mid-range loudspeaker further comprises a damper, and the damper is connected to the voice coil bobbin.

In an embodiment, the damper is sleeved on the voice coil bobbin and fixedly connected to the frame.

In an embodiment, the diaphragm is composed of the honeycomb plate and the covering films, and the diaphragm is flat in shape as a whole, and an outer edge of the diaphragm is fixedly connected to the frame through a yoke ring; the magnetic circuit system comprises a U-yoke, a main magnetic steel, a front sheet, and a secondary magnetic steel, a middle part of the U-yoke is recessed and a peripheral edge extends upwards, an upper end portion of the U-yoke is fixedly connected to the frame, the main magnetic steel, the front sheet and the secondary magnetic steel are stacked on the bottom of the U-yoke and coaxially arranged, and the voice coil is inserted in a gap between the upper end portion of the U-yoke and the front sheet.

Due to the use of the above technical solutions, the present disclosure has the following advantages over the prior art:

in this mid-range loudspeaker, the diaphragm adopts a polyporous honeycomb plate, which can extend the bandwidth to 20 KHz, and improve the high-frequency directivity of the loudspeaker.

BRIEF DESCRIPTION OF THE DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

FIG. 4 shows the frequency response curves of the mid-range loudspeaker according to an embodiment of the present disclosure and a traditional mid-range loudspeaker at 60° off-axis; wherein,

1—frame; 2—diaphragm; 21—honeycomb plate; 210—hole; 22—covering film; 23—yoke ring; 3—magnetic circuit system; 31—U-yoke; 32—main magnetic steel; 33—front sheet; 34—secondary magnetic steel; 4—voice coil; 5—voice coil bobbin; 6—damper.

DETAILED DESCRIPTION OF EXEMPLARY EMBODIMENTS

In the following, the preferable embodiments of the present disclosure are explained in detail combining with the accompanying drawings so that the advantages and features of the present disclosure can be easily understood by the skilled persons in the art. It should be noted that the explanation on these implementations is to help understanding of the present disclosure, and is not intended to limit the present disclosure.

Figure 1:
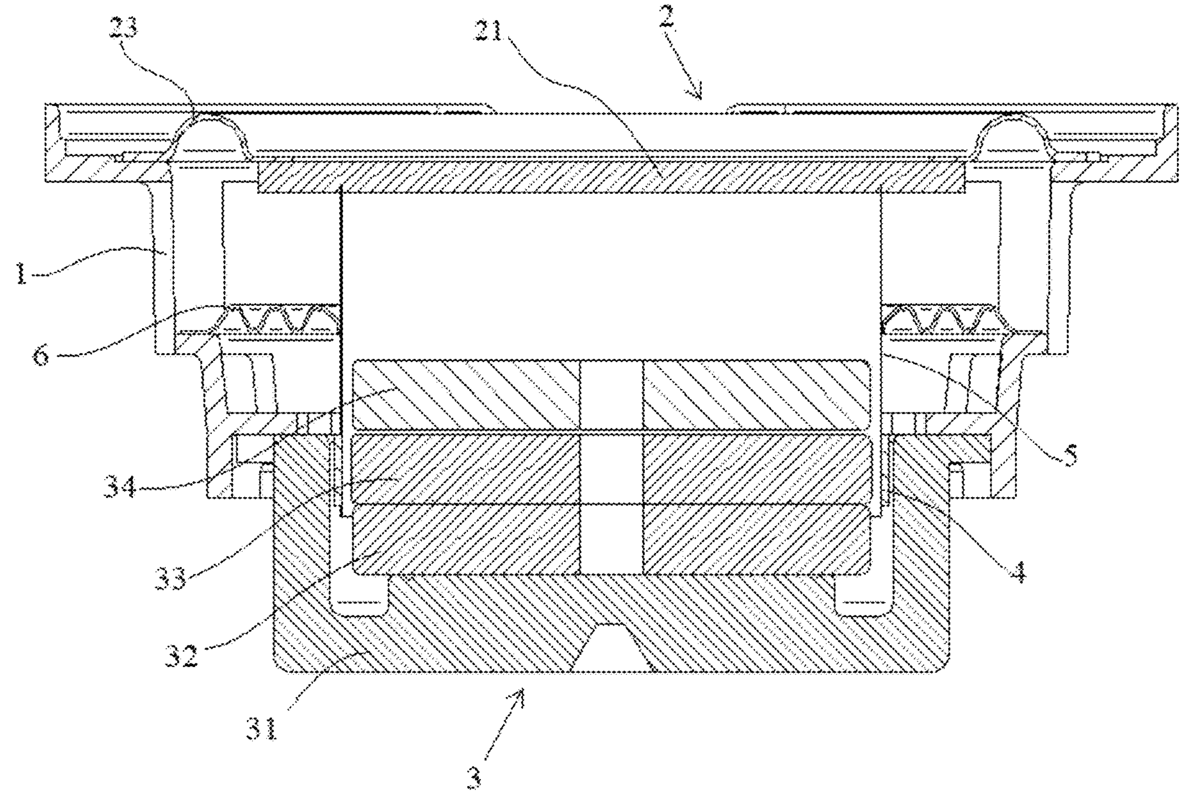
FIG. 1 is a schematic structure diagram of a mid-range loudspeaker according to an embodiment of the present disclosure.

FIG. 1 shows a mid-range loudspeaker according to an embodiment of the present disclosure, which comprises a frame 1, a diaphragm 2 arranged on the frame 1, a magnetic circuit system 3 arranged on the frame 1, and a voice coil 4 connected to the diaphragm 2.

Figure 2:
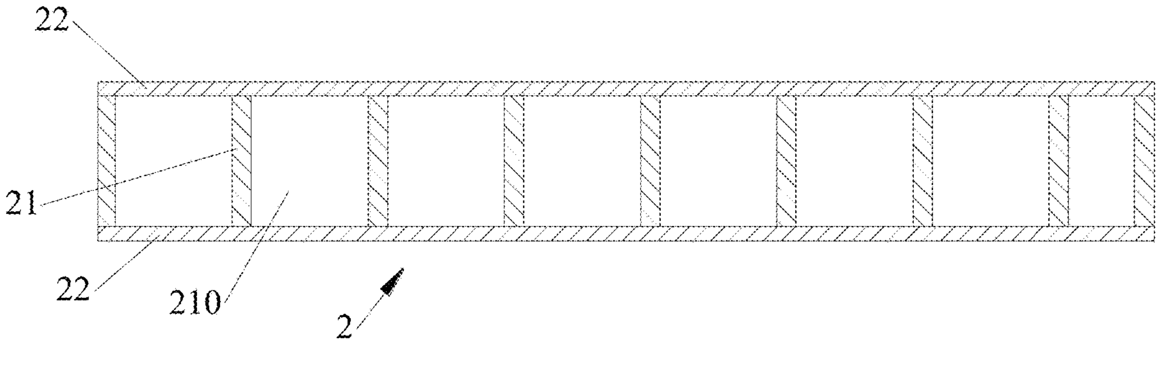
FIG. 2 is a cross-sectional view of the diaphragm in FIG. 1.

Refer to FIG. 2, the diaphragm 2 comprises a honeycomb plate 21 having a front surface and a back surface, and covering films 22 respectively covering the front surface and the back surface of the honeycomb plate 21, and the honeycomb plate 21 is provided with a plurality of holes 210. In other words, the diaphragm 2 has a three-layered structure composed of two covering films 22 and the honeycomb plate 21 located between the two covering films 22. The holes 210 of the honeycomb plate 21 are through holes go though the honeycomb plate 21 from the front surface to the back surface of the honeycomb plate 21, and the shape of the holes 210 is round, square, hexagonal, or the like. The material of the honeycomb plate 21 is paper, Nomex insulation paper, aluminum, or foam material (such as foamed plastic or foamed metal, etc.), wherein Nomex is a kind of meta-aramid, also known as aramid 1313. The material of the covering films 22 is paper, glass fiber, aluminum, or Kevlar.

The diaphragm 2 is flat shaped, specifically, the honeycomb plate 21 is flat in shape as a whole.

In this embodiment, the diaphragm 2 is composed of the honeycomb plate 21 and the covering films 22, and the diaphragm 2 is flat in shape as a whole.

The diaphragm 2 is connected to the frame 1 through a yoke ring 23, and the yoke ring 23 is fixedly connected to an outer edge of the diaphragm 2. Specifically, the yoke ring 23 is fixedly connected to the covering film 22 on the front surface of the honeycomb plate 21.

The magnetic circuit system 3 comprises a U-yoke 31, a main magnetic steel 32, a front sheet 33, and a secondary magnetic steel 34. The middle part of the U-yoke 31 is recessed and the peripheral edge extends upwards, the upper end portion of the U-yoke 31 is fixedly connected to the frame 1, the main magnetic steel 32, the front sheet 33 and the secondary magnetic steel 34 are stacked on the bottom of the U-yoke 31, and the voice coil 4 is inserted in the gap between the upper end portion of the U-yoke 31 and the front sheet 33. The main magnetic steel 32 is glued to the U-yoke 31, the front sheet 33 is glued to the main magnetic steel 32, and the secondary magnetic steel 34 is glued to the front sheet 33, the three are coaxially arranged to ensure concentricity.

The voice coil 4 is fixedly connected to the diaphragm 2 through a voice coil bobbin 5. The mid-range loudspeaker further comprises a damper 6, and the damper 6 is connected to the voice coil bobbin 5. The damper 6 is sleeved on the voice coil bobbin 5 and fixedly connected to the frame 1.

Figure 3:
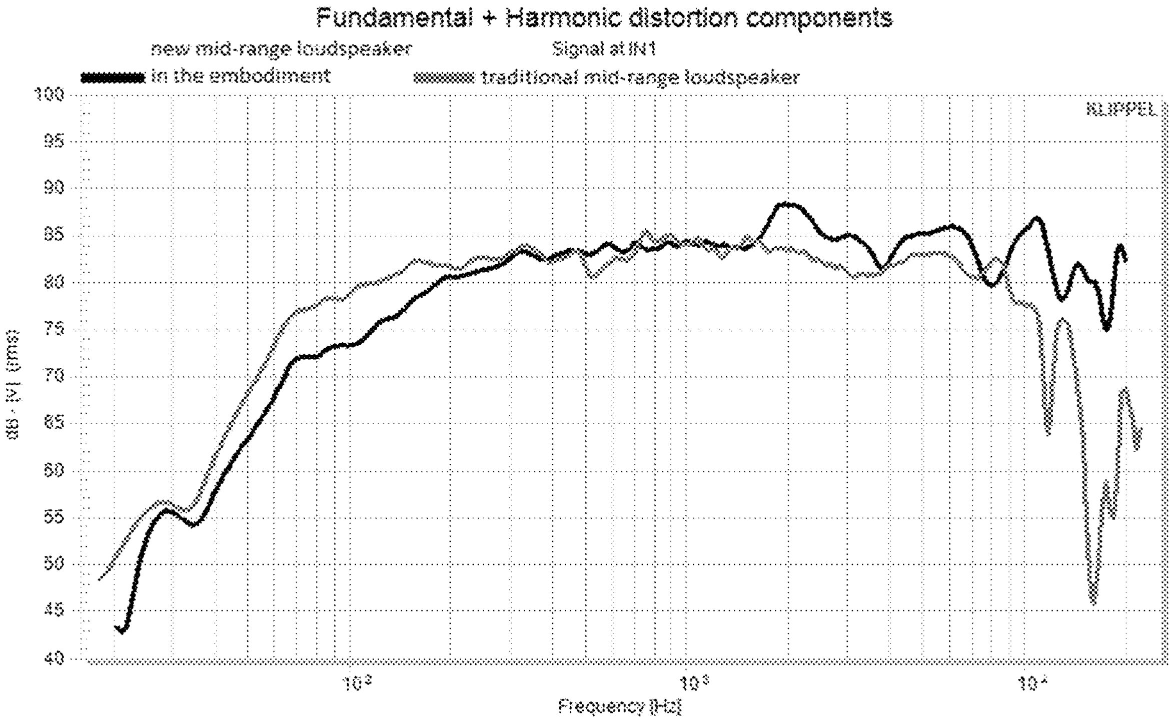
FIG. 3 shows the frequency response curves of the mid-range loudspeaker according to an embodiment of the present disclosure and a traditional mid-range loudspeaker.

Refer to FIG. 3, the frequency response test of the mid-range loudspeaker in this embodiment shown in FIG. 1 and the traditional mid-range loudspeaker were carried out and compared. Wherein, the dark-colored frequency response curve is the frequency response curve of the mid-range loudspeaker in this embodiment shown in FIG. 1, and the light-colored frequency response curve is the frequency response curve of the traditional mid-range loudspeaker. As shown in FIG. 3, it can be seen that the high-frequency extension of the mid-range loudspeaker in this embodiment shown in FIG. 1 is better than that of the traditional mid-range loudspeaker.

Figure 4:
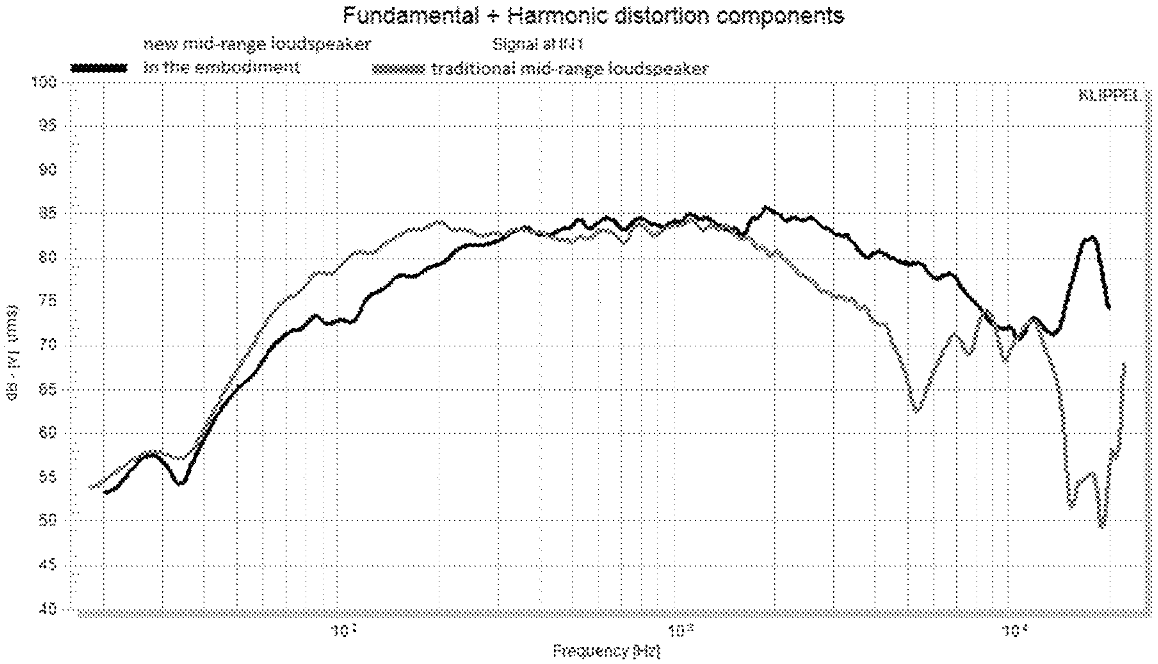

Refer to FIG. 4, the frequency response test of the mid-range loudspeaker in this embodiment shown in FIG. 1 and the traditional mid-range loudspeaker at 60° off-axis were carried out and compared. Wherein, the dark-colored frequency response curve is the frequency response curve of the mid-range loudspeaker in this embodiment shown in FIG. 1 at 60° off-axis, and the light-colored frequency response curve is the frequency response curve of the traditional mid-range loudspeaker at 60° off-axis. As shown in FIG. 4, it can be seen that the directivity of the mid-range loudspeaker in this embodiment shown in FIG. 1 is better than that of the traditional mid-range loudspeaker.

The embodiments described above are only for illustrating the technical concepts and features of the present disclosure, are preferred embodiments, and are intended to make those skilled in the art being able to understand the present disclosure and thereby implement it, and should not be concluded to limit the protective scope of this disclosure.

What is claimed is:

1. A mid-range loudspeaker comprising a frame, a diaphragm arranged on the frame, a magnetic circuit system arranged on the frame, and a voice coil connected to the diaphragm, wherein the diaphragm comprises a honeycomb plate having a front surface and a back surface, and covering films respectively covering the front surface and the back surface of the honeycomb plate, and the honeycomb plate is provided with a plurality of holes, wherein the diaphragm is composed of the honeycomb plate and the covering films, and the diaphragm is flat in shape as a whole, and an outer edge of the diaphragm is fixedly connected to the frame through a yoke ring; the magnetic circuit system comprises a U-yoke, a main magnetic steel, a front sheet, and a secondary magnetic steel, a middle part of the U-yoke is recessed and a peripheral edge extends upwards, an upper end portion of the U-yoke is fixedly connected to the frame, the main magnetic steel, the front sheet and the secondary magnetic steel are stacked on the bottom of the U-yoke and coaxially arranged, and the voice coil is inserted in a gap between the upper end portion of the U-yoke and the front sheet.

2. The mid-range loudspeaker according to claim 1, wherein the holes of the honeycomb plate are through holes that go through the honeycomb plate from the front surface to the back surface thereof.

3. The mid-range loudspeaker according to claim 1, wherein the honeycomb plate is made of one or a combination of paper, Nomex insulation paper, aluminum, and foam material.

4. The mid-range loudspeaker according to claim 1, wherein the covering films are made of one or a combination of paper, glass fiber, aluminum, and Kevlar.

5. The mid-range loudspeaker according to claim 1, wherein the yoke ring is fixedly connected to the covering film on the front surface of the honeycomb plate.

6. The mid-range loudspeaker according to claim 1, wherein the main magnetic steel is glued to the U-yoke, the front sheet is glued to the main magnetic steel, and the secondary magnetic steel is glued to the front sheet.

7. The mid-range loudspeaker according to claim 1, wherein the voice coil is fixedly connected to the diaphragm through a voice coil bobbin.

8. The mid-range loudspeaker according to claim 7, wherein the mid-range loudspeaker further comprises a damper, and the damper is connected to the voice coil bobbin.

9. The mid-range loudspeaker according to claim 8, wherein the damper is sleeved on the voice coil bobbin and fixedly connected to the frame.

* * * * *